US008325667B2

(12) United States Patent
Kishiyama et al.

(10) Patent No.: US 8,325,667 B2
(45) Date of Patent: Dec. 4, 2012

(54) USER EQUIPMENT TERMINAL, BASE STATION, AND UPLINK CONTROL CHANNEL CONFIGURATION METHOD

(75) Inventors: Yoshihisa Kishiyama, Yokosuka (JP); Kenichi Higuchi, Yokohama (JP); Mamoru Sawahashi, Yokohama (JP)

(73) Assignee: NTT Docomo, Inc., Tokyo (JP)

( * ) Notice: Subject to any disclaimer, the term of this patent is extended or adjusted under 35 U.S.C. 154(b) by 215 days.

(21) Appl. No.: 12/672,628

(22) PCT Filed: Aug. 13, 2008

(86) PCT No.: PCT/JP2008/064538
§ 371 (c)(1),
(2), (4) Date: Feb. 8, 2010

(87) PCT Pub. No.: WO2009/022704
PCT Pub. Date: Feb. 19, 2009

(65) Prior Publication Data
US 2011/0032887 A1     Feb. 10, 2011

(30) Foreign Application Priority Data
Aug. 14, 2007   (JP) ................................ 2007-211596

(51) Int. Cl.
*H04W 4/00*        (2009.01)
(52) U.S. Cl. ........ 370/329; 370/342; 370/441; 370/474; 370/479; 370/537; 455/451; 455/509
(58) Field of Classification Search .................. None
See application file for complete search history.

(56) References Cited

U.S. PATENT DOCUMENTS

| | | | |
|---|---|---|---|
| 7,957,317 B2* | 6/2011 | Frederiksen et al. | 370/537 |
| 7,974,177 B2* | 7/2011 | Ofuji et al. | 370/203 |
| 2008/0279170 A1* | 11/2008 | Malladi et al. | 370/343 |
| 2008/0310540 A1* | 12/2008 | Tiirola et al. | 370/329 |

FOREIGN PATENT DOCUMENTS
JP         2000-209301 A       7/2000

OTHER PUBLICATIONS

3GPP TR 25.814 V7.0.0, Jun. 2006, "Physical layer aspects for evolved Universal Terrestrial Radio Access (UTRA)," 126 pages.
3GPP TSG RAN WG1 Meeting #47bis, R1-070100, Sorrento, Italy, Jan. 15-19, 2007, "CDMA-Based Multiplexing Method for Multiple ACK/NACK and CQI in E-UTRA Uplink," 7 pages.
International Search Report issued in PCT/JP2008/064538, mailed on Nov. 18, 2008, with translation, 7 pages.
Written Opinion issued in PCT/JP2008/064538, mailed on Nov. 18, 2008, 3 pages.
Patent Abstracts of Japan, Publication No. 2000-209301, dated Jul. 28, 2000, 1 page.

* cited by examiner

*Primary Examiner* — Jeffrey M Rutkowski
(74) *Attorney, Agent, or Firm* — Osha Liang LLP (57) ABSTRACT

A user equipment terminal for transmitting an uplink control channel to a base station according to a single carrier scheme includes a reception determining unit configured to determine reception of data, which are transmitted from the base station according to scheduling, and generate a reception determination result as first control information; and a control information multiplexing unit configured to assign the first control information to a first radio resource positioned at an end of a system band and assign second control information, which is transmitted with a radio resource dedicated to the user equipment terminal, to a predetermined position in a second radio resource adjacent to the first radio resource, to multiplex the first control information and the second control information into the uplink control channel. The present invention also relates to a base station and an uplink control channel configuration method.

6 Claims, 8 Drawing Sheets

USER EQUIPMENT TERMINAL, BASE STATION, AND UPLINK CONTROL CHANNEL CONFIGURATION METHOD

TECHNICAL FIELD

The present invention relates to a user equipment terminal, a base station, and an uplink control channel configuration method.

BACKGROUND ART

As a next-generation communication system of the W-CDMA (Wideband Code Division Multiple Access) system and the HSDPA (High Speed Downlink Packet Access) system, an LTE (Long Term Evolution) system has been studied by 3GPP ($3^{rd}$ Generation Partnership Project). In the LTE system, a single carrier scheme (SC-FDMA: Single-Carrier Frequency Division Multiple Access) has been studied to be applied to uplink communications (see 3GPP TR 25.814 (V7.0.0), "Physical Layer Aspects for Evolved UTRA", June 2006, for example).

Figure 1:
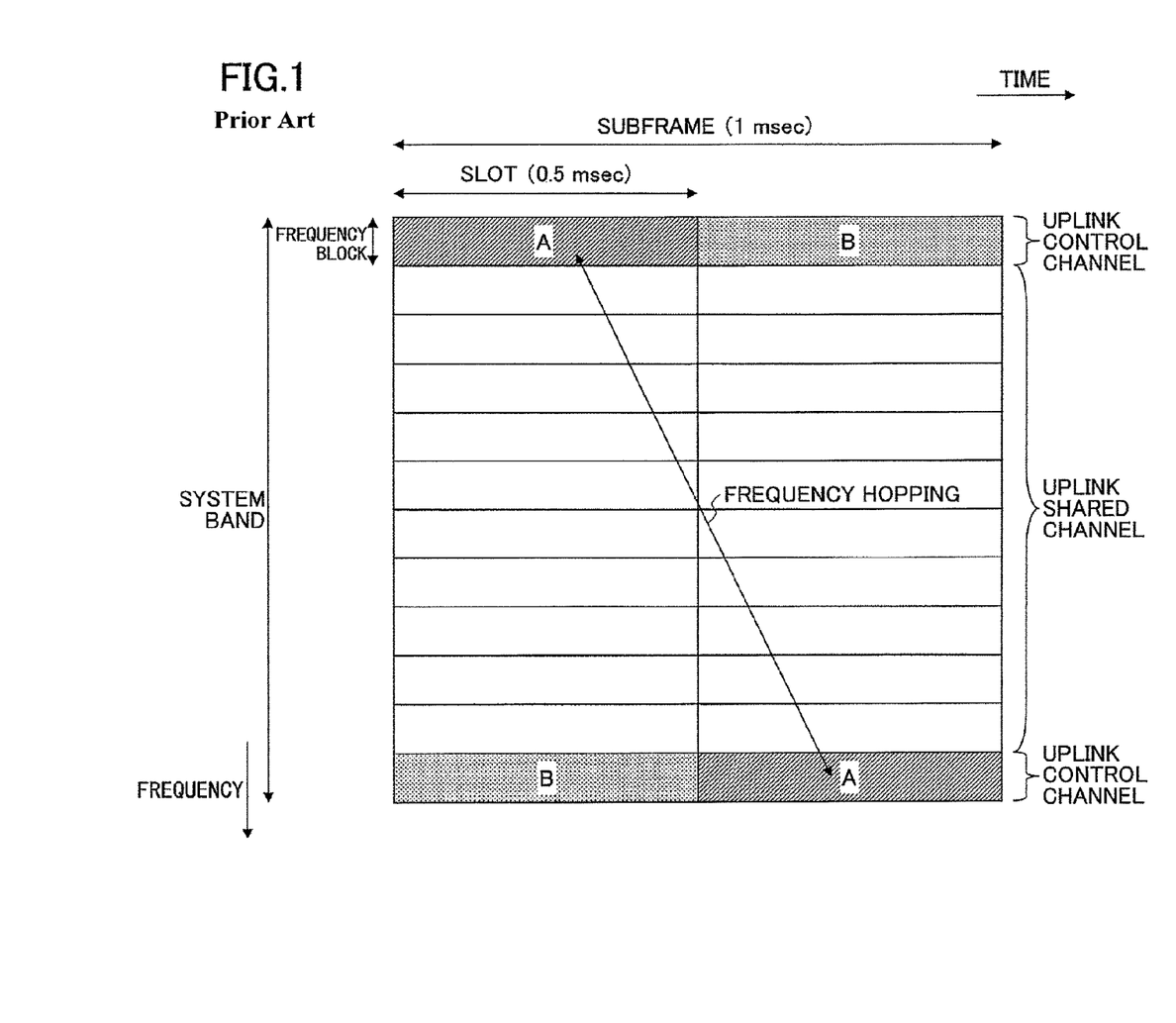
FIG. 1 shows an example configuration of uplink communication channels in LTE.

FIG. 1 shows an example configuration of uplink communication channels in LTE. As shown in FIG. 1, the system band is divided into plural frequency blocks. The frequency block is also referred to as a resource block, which is a minimum unit used in assigning a band. The time domain is divided into transmission units referred to as subframes. The subframe is further divided into two slots.

As the uplink communication channels, an uplink shared channel (PUSCH: Physical Uplink Shared Channel) and uplink control channels A and B (PUCCHs: Physical Uplink Control Channels) are used. User data are transmitted on the uplink shared channel. Control information, such as channel quality information (CQI: Channel Quality Indicator) used for AMC (Adaptive Modulation and Coding), acknowledge information (ACK/NACK) in response to a downlink shared channel, scheduling request information for requesting a base station to perform scheduling when user data are generated in a user equipment terminal, or the like, is transmitted on the uplink control channels A and B. It should be noted that the uplink control channels A and B are mapped to different slots in a single subframe. In other words, frequency hopping is applied (see R1-070100, "CDMA-Based Multiplexing Method for Multiple ACK/NACK and CQI in E-UTRA Uplink", January 2007, for example).

DISCLOSURE OF INVENTION

Problem(s) to be Solved by the Invention

As described above, channel quality information (CQI), acknowledge information (ACK/NACK), and scheduling request information are multiplexed into the uplink control channel. Control information transmitted on the uplink control channel increases with the increase in the amount of traffic. As a result, control information may not be transmitted in a single frequency block. In this case, radio resources may be wasted, unless the uplink control channel and the uplink shared channel are efficiently assigned in the system band.

Furthermore, radio resources reserved for the uplink shared channel may not be efficiently used, unless channel quality information (CQI), acknowledge information (ACK/NACK), and scheduling request information are efficiently multiplexed into the uplink control channel. As a result, processing of the uplink shared channel may be complicated.

In order to solve at least one of these problems, it is a general object of the present invention to efficiently multiplex control information into the uplink control channel and to efficiently use radio resources.

Means for Solving the Problem(s)

In one aspect of the present invention, there is provided a user equipment terminal for transmitting an uplink control channel to a base station according to a single carrier scheme, including:

a reception determining unit configured to determine reception of data, which are transmitted from the base station according to scheduling, and generate a reception determination result as first control information; and a control information multiplexing unit configured to assign the first control information to a first radio resource positioned at an end of a system band and assign second control information, which is transmitted with a radio resource dedicated to the user equipment terminal, to a predetermined position in a second radio resource adjacent to the first radio resource, to multiplex the first control information and the second control information into the uplink control channel.

In another aspect of the present invention, there is provided a base station for receiving an uplink control channel from a user equipment terminal according to a single carrier scheme, including:

a first control channel information generating unit configured to determine assignment of the uplink control channel, such that a reception determination result, which is generated as first control information in response to data transmitted to the user equipment terminal according to scheduling, is assigned to a first radio resource positioned at an end of a system band; and a second control channel information generating unit configured to determine assignment of the uplink control channel, such that second control information, which is transmitted with a radio resource dedicated to the user equipment terminal, is assigned to a second radio resource adjacent to the first radio resource.

In another aspect of the present invention, there is provided an uplink control channel configuration method of configuring an uplink control channel which is transmitted from a user equipment terminal to a base station according to a single carrier scheme, including the steps of:

determining, by the base station, assignment of the uplink control channel, such that a reception determination result, which is generated as first control information in response to data transmitted to the user equipment terminal according to scheduling, is assigned to a first radio resource positioned at an end of a system band;

determining, by the base station, assignment of the uplink control channel, such that second control information, which is transmitted with a radio resource dedicated to the user equipment terminal, is assigned to a second radio resource adjacent to the first radio resource;

determining, by the user equipment terminal, reception of data, which are transmitted from the base station according to scheduling, and generate a reception determination result as the first control information; and assigning, by the user equipment terminal, the first control information to the first radio resource and assigning the second control information to a predetermined position in the second radio resource, to multiplex the first control information and the second control information into the uplink control channel.

Advantageous Effect of the Invention

According to an embodiment of the present invention, it is possible to efficiently multiplex control information into the uplink control channel and to efficiently use radio resources.

DETAILED DESCRIPTION OF THE PREFERRED EMBODIMENTS

[Description of Notations]
10 user equipment terminal
101 control information generating unit
103 control information multiplexing unit
105 downlink data receiving unit
20 base station
201 control channel assigning unit
203 control information separating unit
205 control information receiving unit
207 user-dedicated control channel information generating unit
209 user-common control channel information generating unit
211 control channel information multiplexing unit

BEST MODE OF CARRYING OUT THE INVENTION

With reference to the accompanying drawings, a description is given below with regard to embodiments of the present invention.

<Example Configuration of Uplink Communication Channels>

Figure 2:
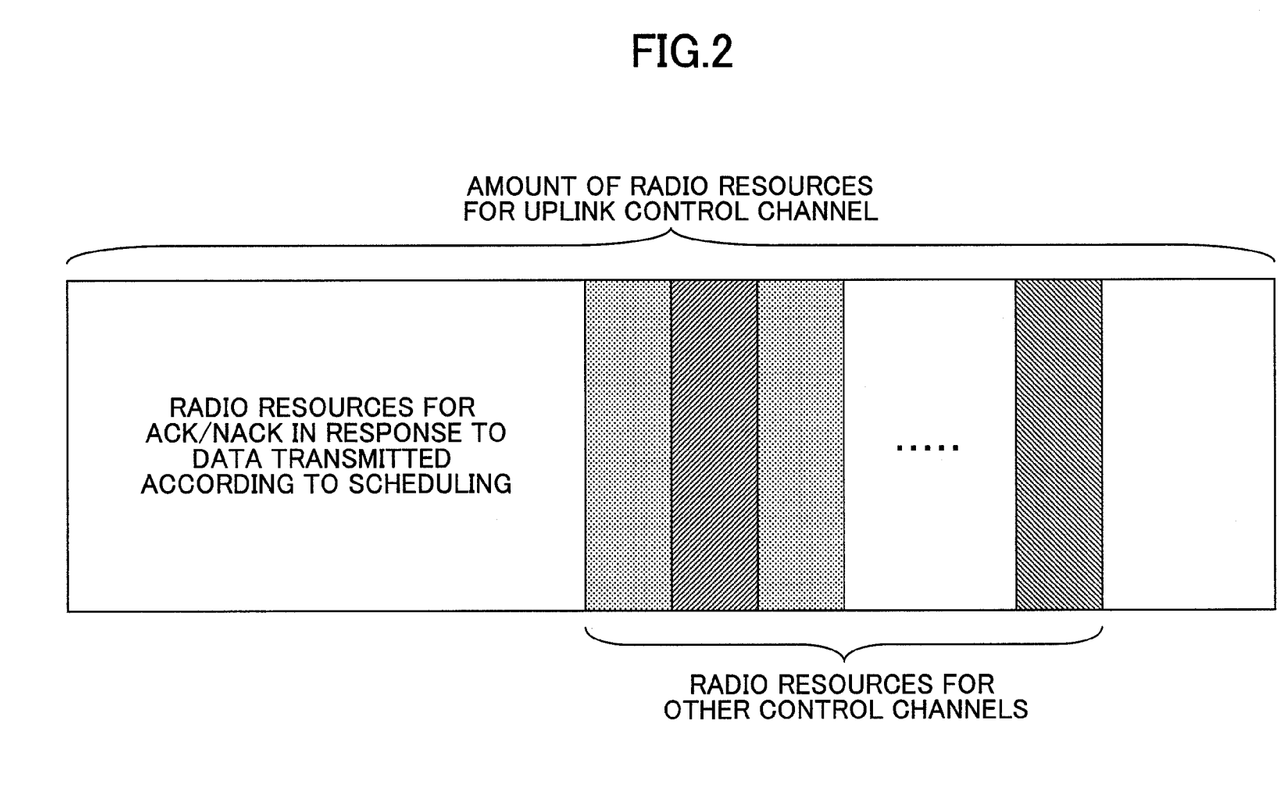
FIG. 2 shows a conceptual diagram illustrating a multiplexing scheme of control information into an uplink control channel in accordance with an embodiment of the present invention.
Figure 3:
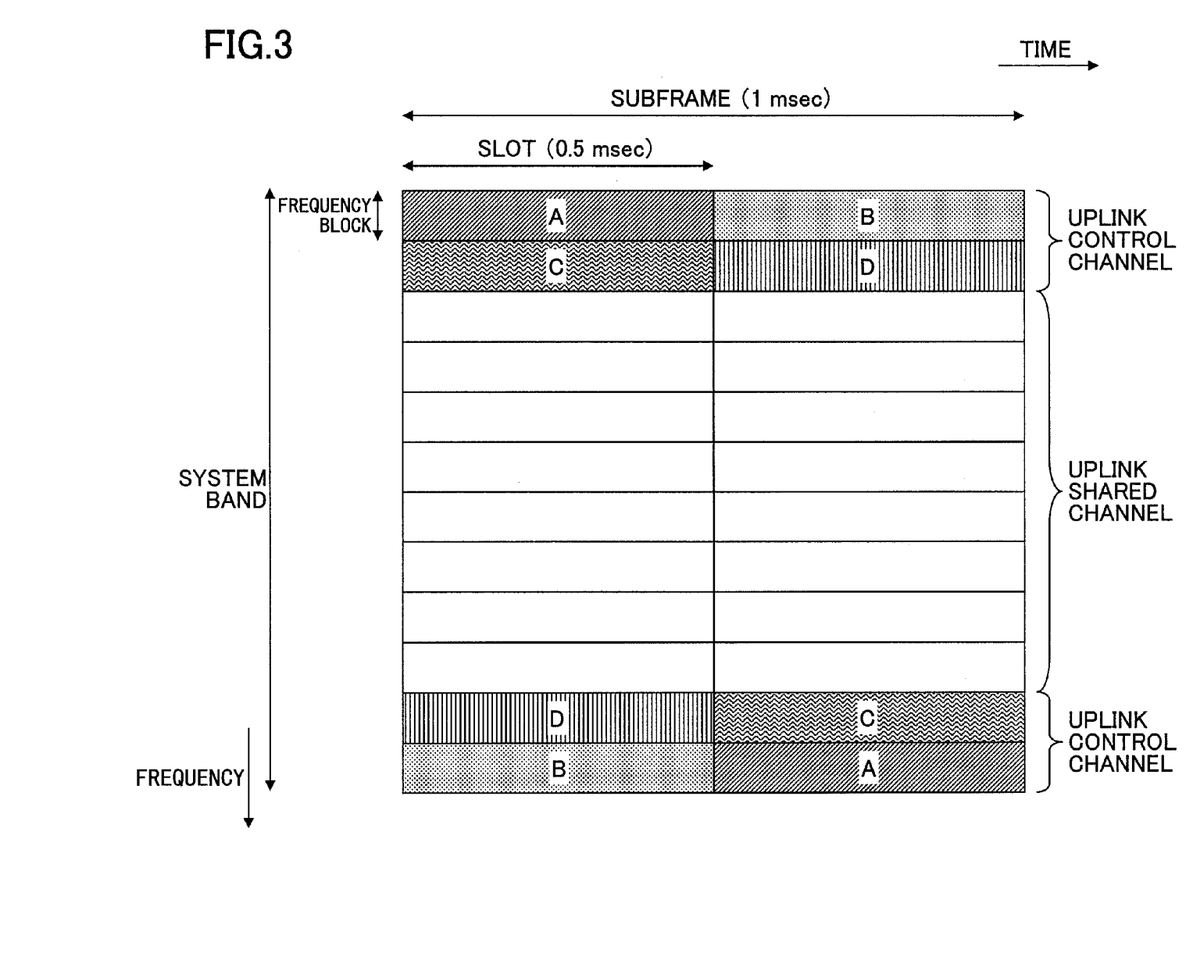
FIG. 3 shows an example configuration of uplink communication channels in accordance with an embodiment of the present invention.

With reference to FIGS. 2 and 3, a configuration of uplink communication channels is described below. FIG. 2 shows a conceptual diagram illustrating a multiplexing scheme of control information into an uplink control channel in accordance with an embodiment of the present invention. FIG. 3 shows an example configuration of the uplink communication channels.

Control information multiplexed into the uplink control channel includes channel quality information (CQI), acknowledge information (ACK/NACK), scheduling request information, and acknowledge information in response to data transmitted according to persistent scheduling. In a broad sense, the channel quality information includes quality information such as the number of antennas (rank) or a weight (precoding vector) for MIMO (Multiple Input Multiple Output) transmission. These types of control information are classified into control information that requires a radio resource to be dedicated (dedicatedly assigned) to a user by means of upper layer signaling and control information that can use radio resources shared by users.

Acknowledge information (ACK/NACK) in response to downlink data which are scheduled in the bases station and transmitted to the user equipment terminal includes an index in a one-to-one relationship with a radio resource number of a downlink control channel. Thus, the acknowledge information (ACK/NACK) can use radio resources shared by users. In other words, once a radio resource for downlink data is determined, a radio resource for acknowledge information (ACK/NACK) in response to the downlink data is uniquely determined. Accordingly, the base station need not reserve a radio resource dedicated to the user. The base station may merely determine a predetermined amount of the radio resources shared by users in advance. When the base station receives acknowledge information with the radio resources shared by users, the base station can uniquely determine in response to which downlink data the acknowledge information is transmitted.

On the other hand, channel quality information (CQI) and scheduling request information have no relationship with the downlink control channel. Thus, the base station needs to dedicate (dedicatedly assign) a radio resource to the user by means of upper layer signaling, for example, and report the position of the radio resource to the user equipment terminal by means of upper layer signaling, for example. Also, when persistent scheduling is applied, according to which periodic radio resources are assigned for data transmission and reception to and from the user equipment terminal, acknowledge information in response to data transmitted according to persistent scheduling has no relationship with the downlink control channel. Thus, the base station needs to dedicate a radio resource to the user and report the position of the radio resource to the user equipment terminal by means of upper layer signaling, for example.

In order to efficiently use radio resources for the uplink control channel, radio resources shared by users are assigned to the end of the system band, as shown in FIG. 2, when these types of control information are multiplexed into the uplink control channel. Since the amount of acknowledge information (ACK/NACK) is determined based on the amount of downlink data, the radio resources may be statically assigned in advance based on the amount of information which can be transmitted in downlink. Then, radio resources for other control channels (channel quality information, scheduling request information, and acknowledge information in response to data transmitted according to persistent scheduling) are assigned adjacent to the radio resources for acknowledge information. This assignment allows for efficient use of radio resources for the uplink control channel and facilitates processing of the uplink control channel in the base station.

In addition, an upper limit may be set for the amount of radio resources for the uplink control channel. For example, the base station performs scheduling of downlink data, such that the amount of radio resources for the uplink control channel does not exceed the upper limit. Setting the upper limit for the amount of radio resources can reduce the number of control bits to be assigned to the user equipment terminal.

With reference to FIG. 3, an approach for assigning the uplink control channel into which control information is to be multiplexed to the uplink communication channels is described below.

The amount of traffic regarding control information increases with the increase in acknowledge information associated with the increase in the amount of data, with a detailed report of channel quality information for each frequency block, and with the increase in scheduling requests associated with the increase in the amount of data transmission from the user equipment terminals. For this reason, all the control information may not be transmitted with the frequency blocks A and B positioned one at each end of the system band. In this case, frequency blocks C and D adjacent to the frequency blocks A and B are assigned to the uplink control channel. In this manner, frequency blocks are assigned to the uplink control channel beginning from the end of the system band, and consequently continuous frequency blocks at the central portion can be assigned to the uplink shared channel. When one piece of user data is assigned to continuous frequency blocks, overhead can be reduced. In this manner, assigning the uplink control channel at the end of the system band allows for efficient use of radio resources.

It should be noted that setting the upper limit for the amount of radio resources for the uplink control channel corresponds to setting an upper limit for the number of frequency blocks used for the uplink control channel.

The configuration of the uplink control channel as shown in FIGS. 2 and 3 allows for efficient multiplexing of control information into the uplink control channel and efficient use of radio resources.

Figure 4:
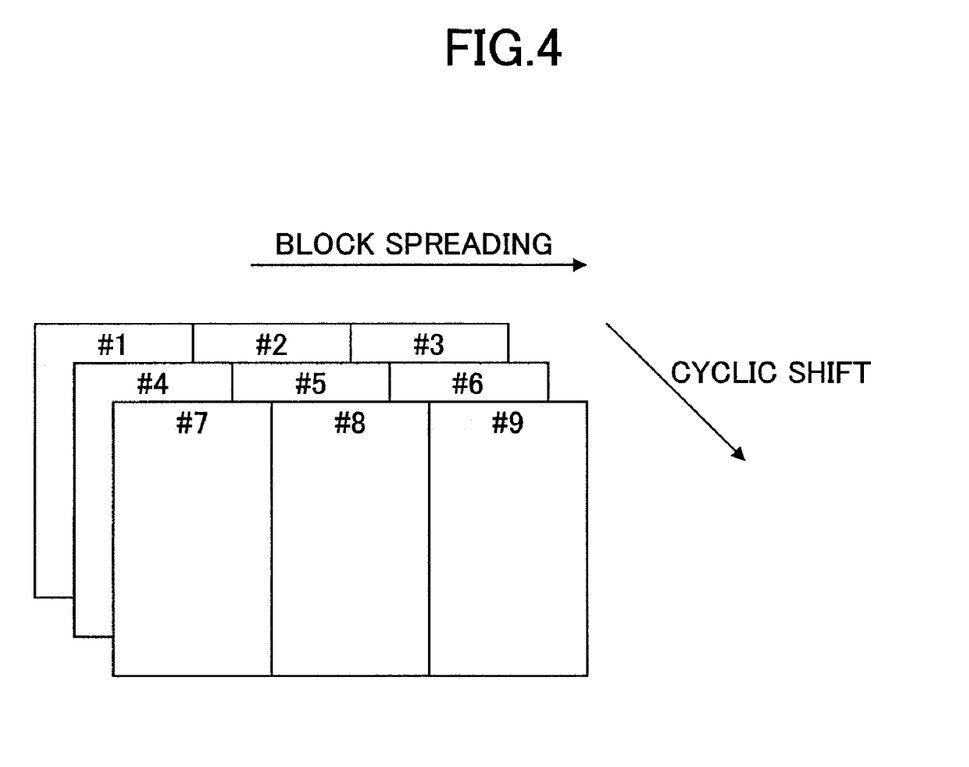
FIG. 4 shows a conceptual diagram illustrating a multiplexing scheme of acknowledge information in a code domain.
Figure 5:
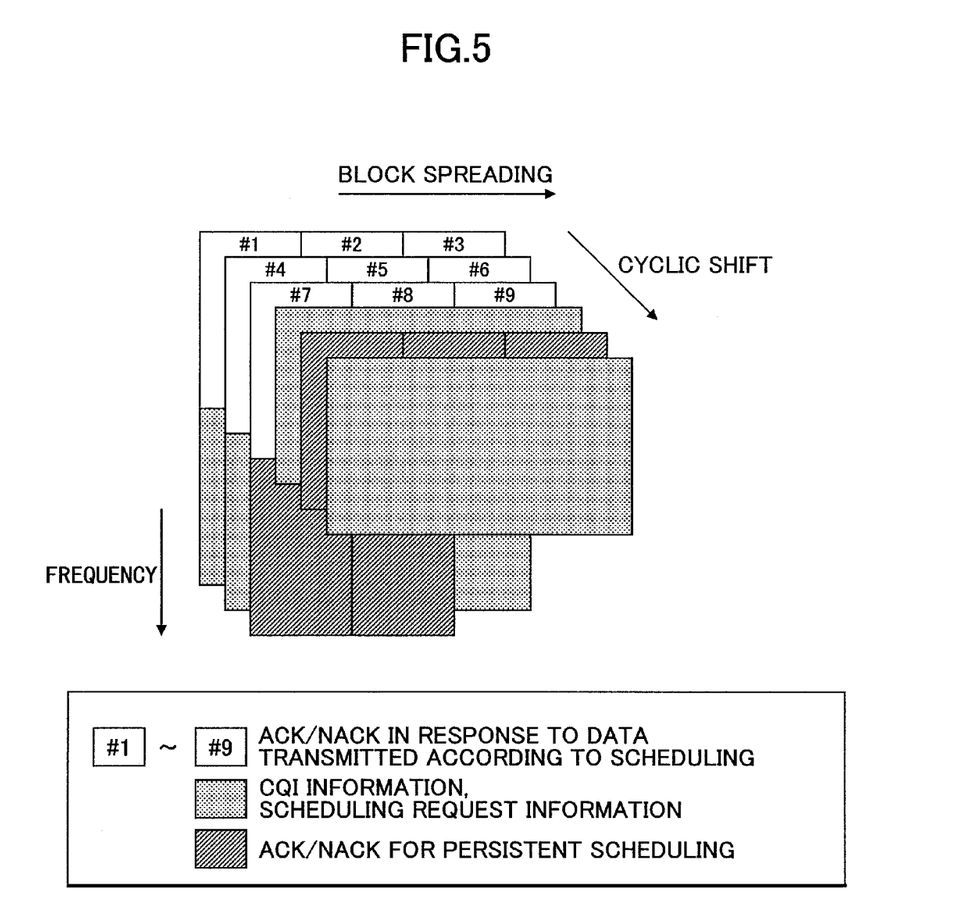
FIG. 5 shows a conceptual diagram illustrating a multiplexing scheme of control information into an uplink control channel in accordance with an embodiment of the present invention.

With reference to FIGS. 4 and 5, an approach for multiplexing control information into the uplink control channel is described in detail below.

As described above, acknowledge information (ACK/NACK) in response to downlink data which are scheduled in the base station and transmitted to the user equipment terminal includes an index in a one-to-one relationship with the radio resource number of the downlink control channel. To multiplex acknowledge information corresponding to indexes #1-#9 as shown in FIG. 4, the user equipment terminal can multiplex the acknowledge information in the code domain. Specifically, assuming that the acknowledge information is expressed in the form of a CAZAC sequence, a predetermined number of codes can be orthogonalized using a single CAZAC sequence by block-spreading the CAZAC sequence. For example, when the phase rotation of 120 degrees is provided, three codes can be orthogonalized using the single CAZAC sequence. In addition, a predetermined number (for example, six) of codes can be further orthogonalized using the single CAZAC sequence by cyclic-shifting the CAZAC sequence. In this manner, the use of the CAZAC sequence allows plural items of acknowledge information to be multiplexed in a single frequency block.

As described with reference to FIG. 2, after acknowledge information is assigned to (multiplexed into) the uplink control channel, control information that requires a radio resource to be dedicated to a user is assigned to the remaining radio resources in the uplink control channel. As shown in FIG. 5, the control information that requires the radio resource to be dedicated to the user is multiplexed in the code domain. When all radio resources available for multiplexing into a single frequency block in the code domain are used, the next frequency block is used. Since the positions of the radio resources for CQI information, scheduling request information, and acknowledge information in response to data transmitted according to persistent scheduling are identified by means of upper layer signaling, these types of information may be multiplexed in any order.

When no downlink data are scheduled in the base station, the corresponding acknowledge information is not transmitted. In other words, there is an available radio resource for the acknowledge information. In this case, other types of control information (control information that requires a radio resource to be dedicated to a user) may be assigned to this available radio resource.

<Configuration of a User Equipment Terminal>

Figure 6:
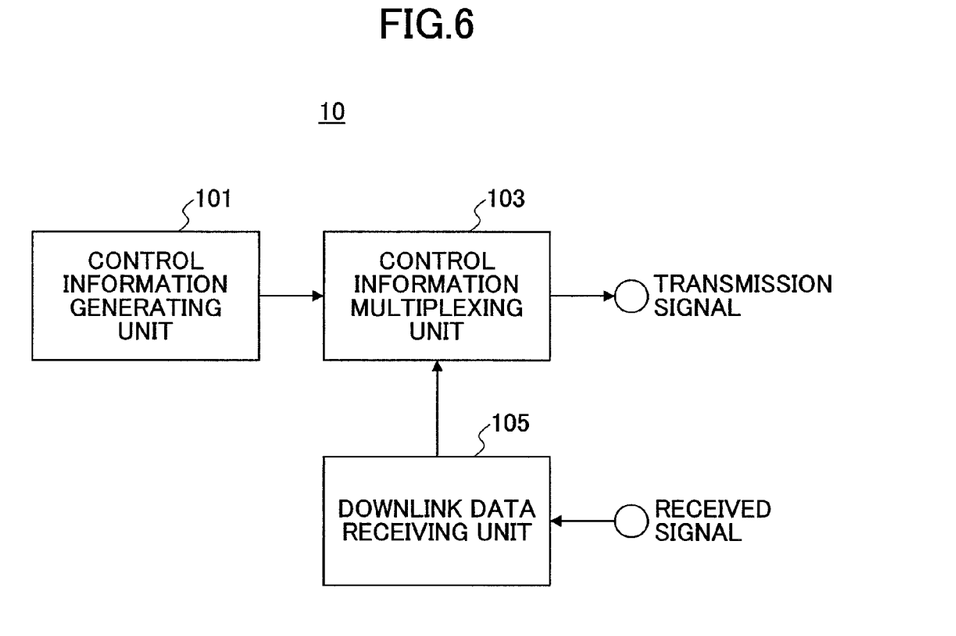
FIG. 6 shows a block diagram of a user equipment terminal in accordance with an embodiment of the present invention.

With reference to FIG. 6, a configuration of a user equipment terminal 10 in accordance with an embodiment of the present invention is described below.

The user equipment terminal 10 includes a control information generating unit 101, a control information multiplexing unit 103, and a downlink data receiving unit 105.

The control information generating unit 101 generates control information to be transmitted with a radio resource dedicated to the user. For example, the control information generating unit 101 generates channel quality information (including quality information for MIMO transmission), scheduling request information, and acknowledge information in response to data transmitted according to persistent scheduling.

The downlink data receiving unit 105 receives data transmitted from the base station according to scheduling. When the data are successfully received, the downlink data receiving unit 105 generates acknowledgement (ACK). When the data have an error, the downlink data receiving unit 105 generates negative acknowledgement (NACK).

The control information multiplexing unit 103 assigns acknowledge information (ACK/NACK) generated by the downlink data receiving unit 105 to the radio resources positioned at the end of the system band. Within the radio resources positioned at the end of the system band, the acknowledge information (ACK/NACK) is assigned to the position corresponding to the radio resource number of downlink data. Then, the control information multiplexing unit 103 assigns to its adjacent radio resources control information to be transmitted with the radio resource dedicated to the user. Within the radio resources adjacent to the radio resources assigned to the acknowledge information, the control information is assigned to the position specified by means of upper layer signaling from the base station. In this manner, the control information multiplexing unit 103 multiplexes acknowledge information (ACK/NACK) and other types of control information into the uplink control channel. When the amount of information in the uplink control channel exceeds the amount of information which can be transmitted in a single frequency block, frequency blocks are used beginning from the end of the system band. The control information multiplexed into the uplink control channel is transmitted to the base station.

While the user equipment terminal 10 is described with separate components for illustrating the embodiment of the present invention, the combination of these components may be embodied in a single piece of hardware or software. Alternatively, one of these components may be embodied in plural pieces of hardware or software.

<Configuration of a Base Station>

Figure 7:
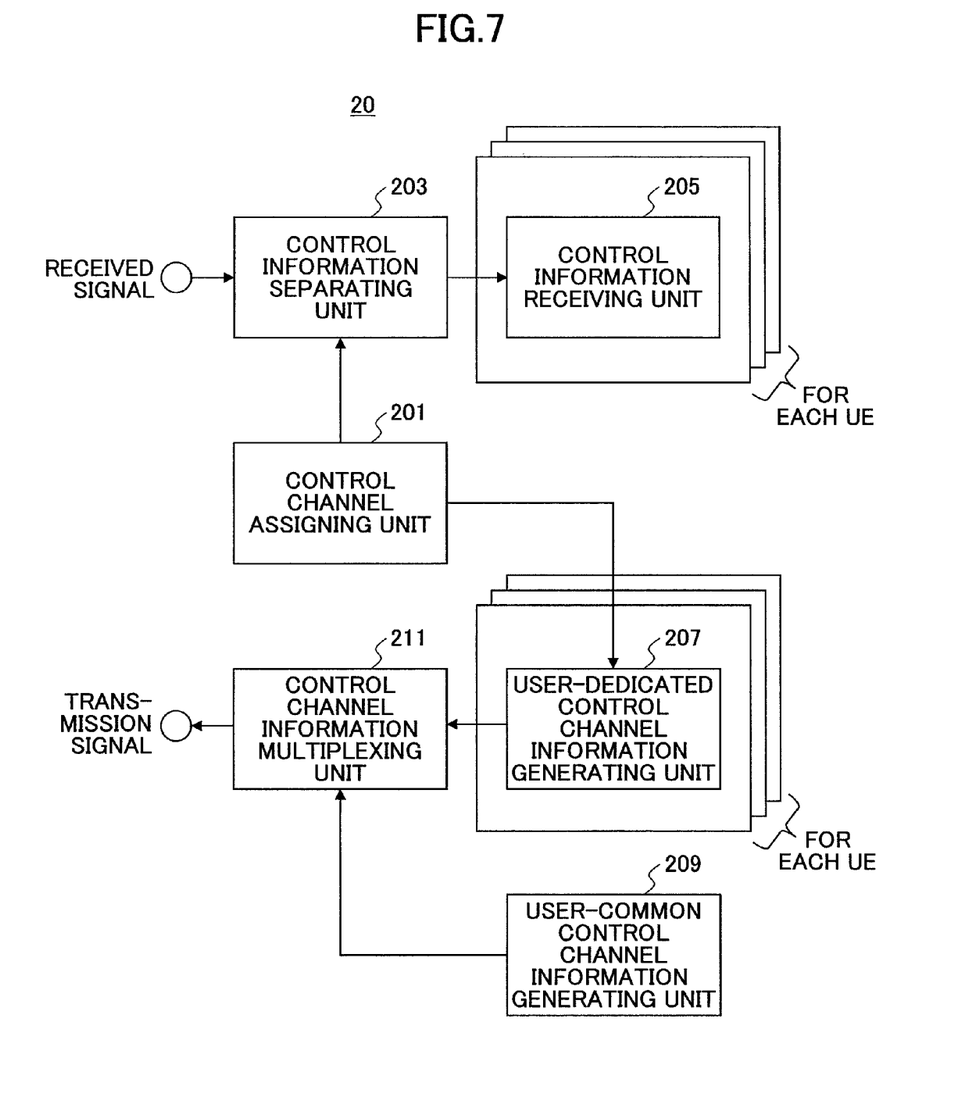
FIG. 7 shows a block diagram of a base station in accordance with an embodiment of the present invention.

With reference to FIG. 7, a configuration of a base station 20 in accordance with the present invention is described below.

The base station 20 includes a control channel assigning unit 201, a control information separating unit 203, a control information receiving unit 205, a user-dedicated control channel information generating unit 207, a user-common control channel information generating unit 209, and a control channel information multiplexing unit 211.

The control channel assigning unit 201 determines radio resources for control information to be assigned to the uplink control channel. Radio resources for receiving from the user equipment terminal acknowledge information in response to downlink data scheduled in the base station are positioned at the end of the uplink control channel. The amount of the radio resources for acknowledge information may be limited to a predetermined amount. In addition, radio resources for channel quality information, scheduling request information, and acknowledge information in response to data transmitted according to persistent scheduling are assigned adjacent to the radio resources for the acknowledge information. Assignment information indicating where control information is actually positioned in these radio resources is reported to the user equipment terminal 10 by means of upper layer signaling, via the user-dedicated control channel information generating unit 207 and the control channel information multiplexing unit 211, as described below.

The control information separating unit 203 separates control information based on the assignment information from the control channel assigning unit 201. Acknowledge information in response to downlink data transmitted to the user equipment terminal according to scheduling is identified by the radio resource number of the downlink control channel within the radio resources positioned at the end of the system band. In addition, other types of control information are identified by the positions reported to the user equipment terminal by means of upper layer signaling. These types of control information are processed for each user in the control information receiving unit 205. For example, the acknowledge information is used for data retransmission, and the channel quality information and the scheduling request information are used for scheduling.

The user-dedicated control channel information generating unit 207 generates control channel information to report to the user equipment terminal the assignment information of the radio resource dedicated to the user by means of upper layer signaling.

The user-common control channel information generating unit 209 generates control channel information to report to the user equipment terminal radio resources to be used for receiving from the user equipment terminal acknowledge information in response to downlink data according to scheduling. It should be noted that the radio resources are shared by users.

The control channel information multiplexing unit 211 multiplexes the control channel information generated by the user-dedicated control channel information generating unit 207 and the control channel information generated by the user-common control channel information generating unit 209. These types of control channel information are transmitted to the user equipment terminals as uplink control channel assignment information.

While the base station 20 is described with separate components for illustrating the embodiment of the present invention, the combination of these components may be embodied in a single piece of hardware or software. For example, the control information receiving unit 205 and the user-dedicated control channel information generating unit 207 may be embodied in a single piece of hardware. Alternatively, one of these components may be embodied in plural pieces of hardware or software.

<Uplink Control Information Transmission Method>

Figure 8:
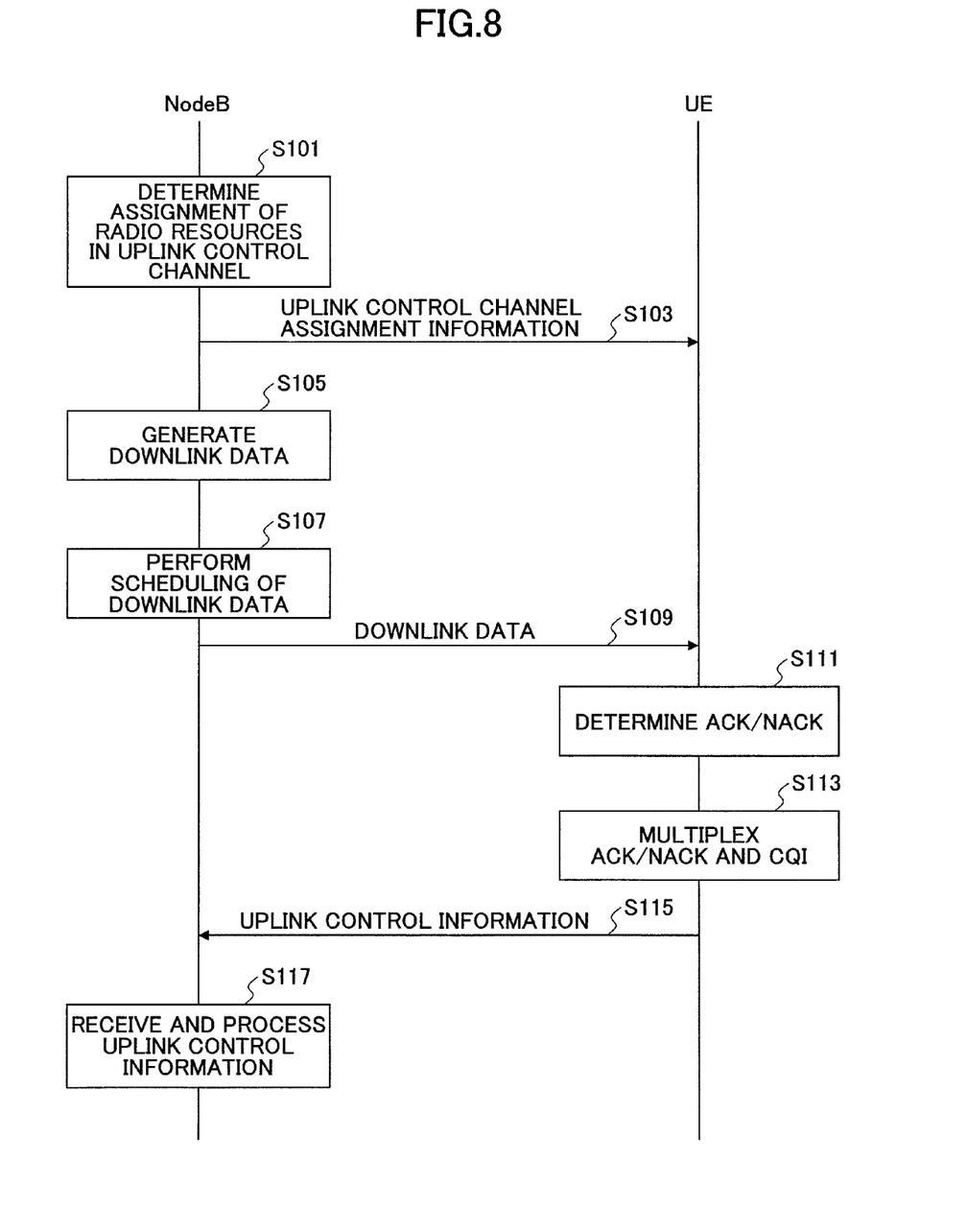
FIG. 8 shows a flowchart of an uplink control information transmission method in accordance with an embodiment of the present invention.

With reference to FIG. 8, an uplink control information transmission method is described below.

First, the base station (Node B) 20 determines assignment of radio resources in the uplink control channel (step S101). Specifically, the base station 20 reserves radio resources positioned at the end of the system band for acknowledge information, and also reserves radio resources adjacent to the radio resources for other types of control information (CQI or the like). In this step, information is determined as to which radio resource is used by the user equipment terminal 10 in the uplink control channel, and then transmitted to the user equipment terminal (UE) 10 as uplink control channel assignment information (step S103).

When downlink data are generated in the base station 20 (step S105), the base station 20 performs scheduling of the downlink data (step S107), transmits the position of the radio resource for the downlink data on the downlink control channel, and transmits the downlink data (step S109).

The user equipment terminal 10 determines whether the downlink data are successfully received (step S111). The determination result (ACK/NACK) is multiplexed at the end of the system band specified by the uplink control channel assignment information. In addition, other types of control information (CQI or the like) are multiplexed at the positions specified by the uplink control channel assignment information (step S113). The user equipment terminal 10 transmits the acknowledge information and other types of control information (CQI or the like) to the base station 20 on the uplink control channel (step S115).

The base station 20 separates the types of control information from the uplink control channels received from the user equipment terminals 10 and performs retransmission or scheduling according to the control information (step S117).

As described above, according to an embodiment of the present invention, it is possible to efficiently multiplex control information into the uplink control channel and to efficiently use radio resources. While the preferred embodiments of the present invention have been described, the present invention is not limited to these embodiments. Rather, the present invention can be changed or modified within the scope of the appended claims. For example, the present invention is not limited to the mobile communication system according to LTE, but may be applied to any mobile communication system in which an uplink control channel is transmitted according to a single-carrier scheme.

This international application claims the benefit of the priority dates of Japanese Patent Application No. 2007-211596 filed on Aug. 14, 2007, the entire content of which is herein incorporated hereby by reference.

The invention claimed is:

1. A user equipment terminal for transmitting an uplink control channel to a base station according to a single carrier scheme, comprising:

a reception determining unit configured to determine reception of data, which are transmitted from the base station, and generate a reception determination result as acknowledgement information; and a control information multiplexing unit configured to assign the uplink control channel including the acknowledgement information generated by the reception determining unit to a radio resource which has a one-to-one relationship with a radio resource number of a downlink control channel, when the data whose reception is determined by the reception determining unit do not correspond to data transmitted according to persistent scheduling, and assign the uplink control channel including the acknowledgement information generated by the reception determining unit to a radio resource identified by means of upper layer signaling, when the data whose reception is determined by the reception determining unit correspond to data transmitted according to persistent scheduling.

2. The user equipment terminal as claimed in claim 1, further comprising:

a control information generating unit configured to generate channel quality information, wherein:

upon including the channel quality information generated by the control information generating unit in the uplink control channel, the control information multiplexing unit places the uplink control channel on resource blocks in an outer portion of a system band; and upon including the acknowledgement information generated by the reception determining unit in the uplink control channel, the control information multiplexing unit places the uplink control channel on resource blocks in the outer portion of the system band that are different from the resource blocks on which the uplink control channel including the channel quality information is to be placed.

3. The user equipment terminal as claimed in claim 2, wherein:

the control information multiplexing unit generates uplink control channel by channel by using a cyclic-shifted CAZAC sequence for the channel quality information generated by the control information generating unit.

4. The user equipment terminal as claimed in claim 1, wherein:

the control information multiplexing unit generates the uplink control channel by using a cyclic-shifted CAZAC sequence and block spreading for the acknowledgement information generation by the reception determining unit.

5. A method for use in a user equipment terminal for transmitting an uplink control channel to a base station according to a single carrier scheme, comprising the steps of:

determining reception of data, which are transmitted from the base station, and generating a reception determination result as acknowledgement information; and assigning the uplink control channel including the acknowledgement information to a radio resource which has a one-to-one relationship with a radio resource number of a downlink control channel, when the data whose reception is determined do not correspond to data transmitted according to persistent scheduling, and assigning the uplink control channel including the acknowledgement information to a radio resource identified by means of upper layer signaling, when the data whose reception is determined correspond to data transmitted according to persistent scheduling.

6. A communication system including a user equipment terminal for transmitting an uplink control channel according to a single carrier scheme and a base station for receiving the uplink control channel from the user equipment terminal, the user equipment terminal comprising:

a reception determining unit configured to determine reception of data, which are transmitted from the base station, and generate a reception determination result as acknowledgement information; and a control information multiplexing unit configured to assign the uplink control channel including the acknowledgement information generated by the reception determining unit to a radio resource which has a one-to-one relationship with a radio resource number of a downlink control channel, when the data whose reception is determined by the reception determining unit do not correspond to data transmitted according to persistent scheduling, and assign the uplink control channel including the acknowledgement information generated by the reception determining unit to a radio resource identified by means of upper layer signaling, when the data whose reception is determined by the reception determining unit correspond to data transmitted according to persistent scheduling.

* * * * *